United States Patent
Nagwanshi et al.

(10) Patent No.: US 8,474,583 B2
(45) Date of Patent: Jul. 2, 2013

(54) IMPACT DEVICE AND METHODS OF MAKING AND USING THE SAME

(71) Applicants: Dhanendra Kumar Nagwanshi, Bangalore (IN); Kent Allen, Royal Oak, MI (US); Takaaki Nemoto, Mishima (JP); Shingo Imai, Wixom, MI (US); Arunachala Parameshwara, Bangalore (IN)

(72) Inventors: Dhanendra Kumar Nagwanshi, Bangalore (IN); Kent Allen, Royal Oak, MI (US); Takaaki Nemoto, Mishima (JP); Shingo Imai, Wixom, MI (US); Arunachala Parameshwara, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/716,607

(22) Filed: Dec. 17, 2012

(65) Prior Publication Data
US 2013/0106139 A1 May 2, 2013

Related U.S. Application Data

(63) Continuation of application No. 12/939,374, filed on Nov. 4, 2010, now Pat. No. 8,336,933.

(51) Int. Cl.
*F16F 7/12* (2006.01)
(52) U.S. Cl.
USPC .......................................... 188/371; 188/377
(58) Field of Classification Search
USPC .................. 188/371, 376, 377; 293/131, 132, 293/133, 136; 296/187.03, 187.04, 187.05, 296/187.08, 187.09, 187.1, 187.11, 187.12
See application file for complete search history.

(56) References Cited

U.S. PATENT DOCUMENTS

| | | | |
|---|---|---|---|
| 3,162,745 A | 12/1964 | Rohr | |
| 3,842,944 A | 10/1974 | Shiotani et al. | |
| 4,227,593 A * | 10/1980 | Bricmont et al. | 188/377 |
| 4,890,877 A * | 1/1990 | Ashtiani-Zarandi et al. | 296/146.7 |
| 5,139,297 A | 8/1992 | Carpenter et al. | |
| 5,306,066 A * | 4/1994 | Saathoff | 296/146.6 |
| 5,480,729 A | 1/1996 | Hattori et al. | |
| 5,715,917 A * | 2/1998 | Smallwood | 188/377 |
| 5,819,408 A | 10/1998 | Catlin | |
| 6,299,958 B1 | 10/2001 | St. Julien et al. | |
| 6,494,510 B2 | 12/2002 | Okamura et al. | |

(Continued)

FOREIGN PATENT DOCUMENTS

| | | |
|---|---|---|
| DE | 102007038087 A1 | 2/2009 |
| EP | 1065108 A2 | 1/2001 |

(Continued)

OTHER PUBLICATIONS

Japanese Patent No. 09020267 (A); Publication Date: Jan. 21, 1997; Abstract Only; 1 Page.

(Continued)

*Primary Examiner* — Lori Lyjak
(74) *Attorney, Agent, or Firm* — Cantor Colburn LLP

(57) ABSTRACT

In an embodiment, an impact device comprises: a metal component comprising greater than or equal to three walls forming a metal component channel; and a plastic component having a honeycomb structure with a plurality of walls defining comb channels therein. The combs channels are oriented perpendicular to at least one of the three walls, and the plastic component is inseparable from the metal component without damage to at least one of the metal component and the plastic component. A wall of the metal component can comprise an aperture, and wherein plastic material from the plastic component is located in the aperture.

15 Claims, 4 Drawing Sheets

U.S. PATENT DOCUMENTS

| | | | |
|---|---|---|---|
| 6,503,585 B1 | 1/2003 | Wagenblast et al. | |
| 6,513,843 B1 | 2/2003 | Frederick et al. | |
| 6,540,275 B1 | 4/2003 | Iwamoto et al. | |
| 6,547,295 B2 * | 4/2003 | Vismara | 293/133 |
| 6,685,243 B1 | 2/2004 | Evans | |
| 6,866,294 B2 * | 3/2005 | Horsch et al. | 280/752 |
| 6,866,331 B2 | 3/2005 | Kropfeld | |
| 6,938,936 B2 | 9/2005 | Mooijman et al. | |
| 7,004,502 B2 * | 2/2006 | Borroni-Bird et al. | 280/784 |
| 7,044,514 B2 | 5/2006 | Mustafa et al. | |
| 7,086,690 B2 | 8/2006 | Shuler et al. | |
| 7,134,700 B2 | 11/2006 | Evans | |
| 7,163,243 B2 | 1/2007 | Evans | |
| 7,222,896 B2 | 5/2007 | Evans | |
| 7,517,006 B2 | 4/2009 | Kageyama et al. | |
| 7,520,561 B2 | 4/2009 | Nakamae et al. | |
| 7,806,448 B2 | 10/2010 | Allen et al. | |
| 7,879,435 B2 | 2/2011 | Mett et al. | |
| 2001/0026072 A1 | 10/2001 | Sato et al. | |
| 2002/0017805 A1 * | 2/2002 | Carroll et al. | 296/189 |
| 2002/0043809 A1 * | 4/2002 | Vismara | 293/133 |
| 2002/0050413 A1 | 5/2002 | Renault | |
| 2002/0070584 A1 * | 6/2002 | Carroll et al. | 296/189 |
| 2003/0034658 A1 | 2/2003 | Cate et al. | |
| 2003/0067179 A1 | 4/2003 | Bastien et al. | |
| 2003/0164618 A1 | 9/2003 | Gentle | |
| 2004/0051321 A1 | 3/2004 | Hanai et al. | |
| 2004/0124643 A1 | 7/2004 | Matsumoto et al. | |
| 2004/0174025 A1 | 9/2004 | Converse et al. | |
| 2006/0181089 A1 | 8/2006 | Andre et al. | |
| 2008/0048462 A1 | 2/2008 | Zabik | |
| 2008/0246277 A1 | 10/2008 | Gallagher et al. | |
| 2008/0286522 A1 | 11/2008 | Khan et al. | |
| 2009/0160203 A1 | 6/2009 | Garg et al. | |
| 2009/0309387 A1 | 12/2009 | Goral et al. | |

FOREIGN PATENT DOCUMENTS

| | | | |
|---|---|---|---|
| EP | 1369309 | A1 | 12/2003 |
| EP | 1652733 | A1 | 5/2006 |
| EP | 1759959 | A2 | 3/2007 |
| FR | 1473197 | A1 | 11/2004 |
| FR | 2887508 | A1 | 12/2006 |
| GB | 2384217 | A | 7/2003 |
| JP | 09020267 | A | 1/1997 |
| JP | 2006247237 | A | 9/2006 |
| WO | 2005100100 | A1 | 10/2005 |
| WO | 2005105554 | A1 | 11/2005 |
| WO | 2006065868 | A2 | 6/2006 |
| WO | 2006119225 | A2 | 11/2006 |
| WO | 2008016653 | A2 | 2/2008 |

OTHER PUBLICATIONS

German Patent No. 102007038087 (A1); Publication Date: Feb. 12, 2009; Abstract Only; 1 Page.
European Patent No. 1369309 (A1); Publication Date: Dec. 10, 2003; English Machine Translation; 13 pages.
European Patent No. 1473197 (A1); Publication Date: Nov. 3, 2004; Abstract Only; 1 Page.
European Patent No. 1652733 (A1); Publication Date: May 3, 2006; Abstract Only; 1 Page.
European Patent No. 1759959 (A2); Publication Date: Mar. 7, 2007; Abstract Only; 1 Page.
European Patent No. 1759959 (A2); Publication Date: Mar. 7, 2007; Machine Translation; 18 Pages.
International Publication No. 2005100100 (A1); Publication Date: Oct. 27, 2005; Abstract Only; 1 Page.
International Publication No. 2006136743 (A3); Publication Date: Mar. 15, 2007; Abstract Only; 1 Page; Equivalent to French Patent No. 2887508 (A1).
Japanese Patent No. 2006247237 (A); Date of Publication: Sep. 21, 2006; Abstract Only; 1 Page.
International Search Report; International Application No. PCT/US2011/055733; International Filing Date: Oct. 11, 2011; Date of Mailing: Dec. 28, 2011; 4 Pages.
Written Opinion of the International Searching Authority; International Application No. PCT/US2011/055733; International Filing Date: Oct. 11, 2011; Date of Mailing: Dec. 28, 2011; 8 Pages.
U.S. Appl. No. 12/973,184, filed Dec. 20, 2010; "Reinforced Body in White and Method of Making and Using the Same".

* cited by examiner

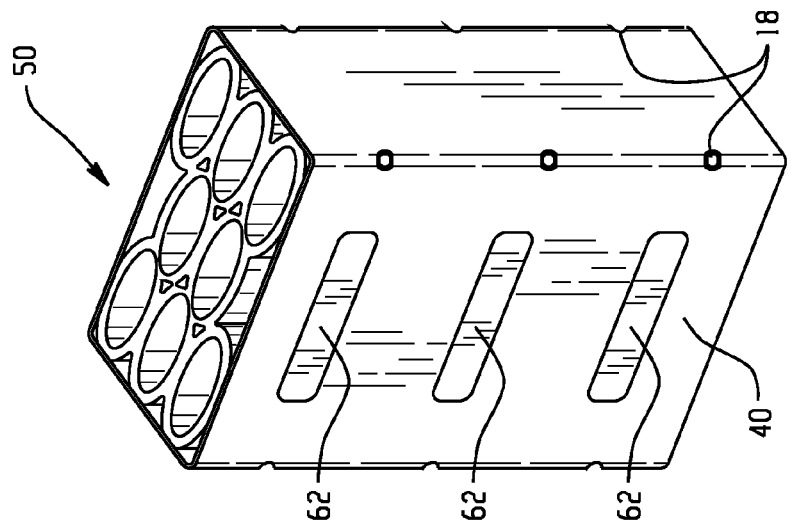
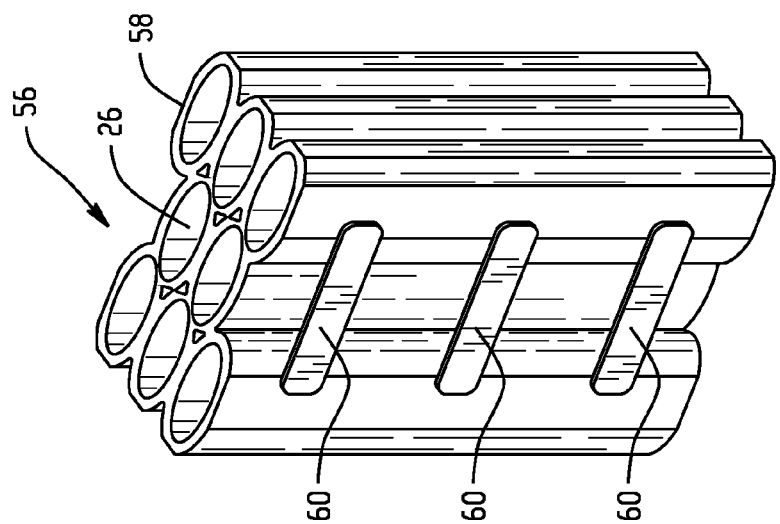
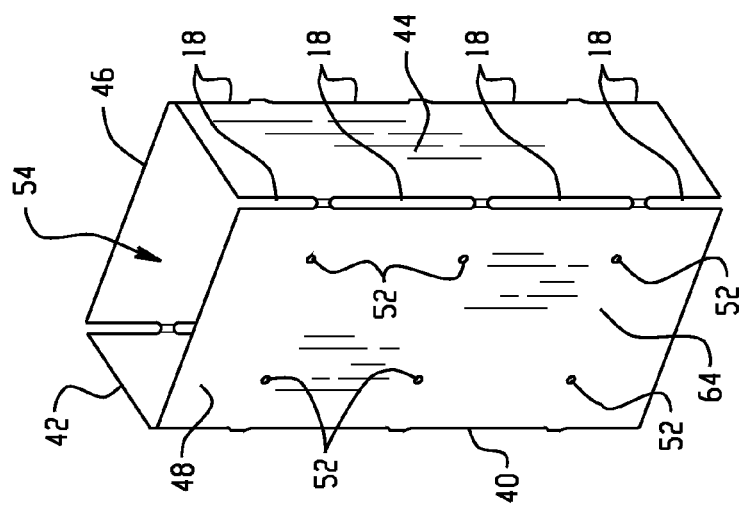

IMPACT DEVICE AND METHODS OF MAKING AND USING THE SAME

CROSS REFERENCE TO RELATED APPLICATIONS

This application is a continuation of U.S. patent application Ser. No. 12/939,374, filed on Nov. 4, 2010, now U.S. Pat. No. 8,336,933, which is herein incorporated by reference in its entirety.

BACKGROUND

The present disclosure relates generally to an energy absorbing device for use in a vehicle, for example, to reduce vehicle damage.

Bumper systems generally extend widthwise, or transverse, across the front and rear of a vehicle and are mounted to rails that extend in a lengthwise direction. Many bumper assemblies for an automotive vehicle include a bumper beam and an injection molded energy absorber secured to the bumper beam with a fascia covering the energy absorber.

Beneficial energy absorbing bumper systems achieve high efficiency by building load quickly to just under the load limit of the rails and maintain that load constant until the impact energy has been dissipated. Energy absorbing systems attempt to reduce vehicle damage as a result of a collision by managing impact energy absorption. Bumper system impact requirements are set forth by United States Federal Motor Vehicle Safety Standards (US FMVSS), Canadian Motor Vehicle Safety Standards (CMVSS), European EC E42 consumer legislation, EuroNCAP pedestrian protection requirements, Allianz impact requirements, and Asian Pedestrian Protection for lower and upper legs. In addition, the Insurance Institute for Highway Safety (IIHS) has developed different barrier test protocols on both front and rear bumper systems. These requirements must be met for the various design criteria set forth for each of the various automotive platforms and car models. If there is even very limited damage to any component of the frame of the vehicle, costs of repairing the vehicle can escalate dramatically.

This generates the need to develop low cost, lightweight, and high performance energy absorbing systems that will deform and absorb impact energy to ensure a good vehicle safety rating and reduce vehicle damage in low speed collisions. Different components due to their inherent geometry and assembly requirements need different energy absorber designs to satisfy the impact criteria. Therefore, the automotive industry is continually seeking economic solutions to improve the overall safety rating of a vehicle. Hence, there is a continual need to provide a solution that would reduce vehicle damage and/or enhance a vehicle safety rating.

BRIEF DESCRIPTION

Disclosed, in various embodiments, are energy absorbing devices that can be used in conjunction with various vehicle components.

In an embodiment, an impact device comprises: a metal component comprising greater than or equal to three walls forming a metal component channel; and a plastic component having a honeycomb structure with a plurality of walls defining comb channels therein. The combs channels are oriented perpendicular to at least one of the three walls, and the plastic component is inseparable from the metal component without damage to at least one of the metal component and the plastic component. A wall of the metal component can comprise an aperture, and wherein plastic material from the plastic component is located in the aperture. The device can be located in a vehicle to prevent damage to the body in white upon impact.

In one embodiment, a method of making an impact device can comprise: forming a metal component comprising greater than or equal to three walls forming a metal component channel; forming a plastic component; and flowing plastic through an aperture in the metal component. The plastic component has a honeycomb structure with a plurality of walls defining comb channels therein wherein the comb channels that are oriented perpendicular to at least one of the three walls, and the plastic component is inseparable from the metal component without damage to at least one of the metal component and the plastic component.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 4 is a front view of a metal component of an energy absorbing device.

FIG. 5 is a front view of a plastic component of an energy absorbing device.

FIG. 6 is a front view of an energy absorbing device comprising a metal component and a plastic component.

DETAILED DESCRIPTION

Figure 1:
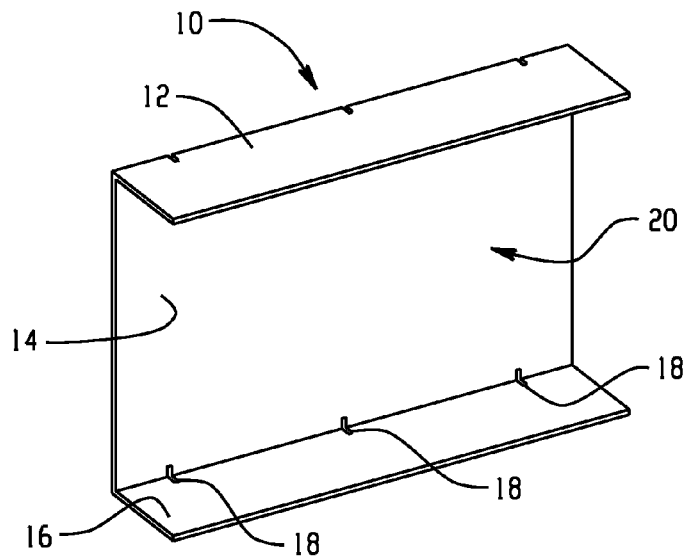
FIG. 1 is a front view of a metal component of an energy absorbing device.

Disclosed herein, in various embodiments, are energy absorbing devices which can be used in conjunction with vehicle components, e.g., to minimize the damage suffered during an impact. The energy absorbing devices can comprise a metal component and a plastic component (e.g., thermoplastic), which can be manufactured utilizing various co-molding processes to provide a single piece assembled unit (e.g., integrally formed metal component around the plastic component).

Attempts have been made to provide bumpers for automotive vehicles, which could be able to absorb a major portion of impact energy during a crash, including impact energy absorption devices made of alveolar structures more commonly referred to as "honeycomb". The combs of the structure can be any polygonal or rounded shape, such as circular, oval, square, rectangular, triangular, diamond, pentagonal, hexagonal, heptagonal, and octagonal geometries as well as combinations comprising at least one of the foregoing geometries.

Metal honeycombs, however, have good energy absorption characteristics and good creep performance, but involve very high manufacturing cost, and generally weigh more than plastic honeycombs. Plastic honeycombs can be made by gluing extruded plastic tubes together or injection molding the plastic honeycombs. The extruded plastic honeycombs involve high cost and possess limited fields of application due to relatively thin walls. For example, with extrusion processes it can be difficult to produce thicker walls (e.g., greater than about 2 millimeters (mm)), as plastic walls thicker than about 2 mm can undergo sagging which could result in the profile and the pitch of the honeycomb becoming distorted, while the injection molded plastic honeycombs are relatively cheaper but their impact energy absorption performance is inferior. Both extruded and injection molded honeycombs have inferior creep performance compared to the metal honeycombs and undergo significant deformation in the transverse direction (e.g., gravitational load) while used to support relatively heavier components (e.g., bumper beams). Generally, the energy absorbing devices support a metallic bumper beam. Due to the gravitational load of the beam weight, the energy absorbing devices have the tendency to deform over a period of time and/or when exposed to higher temperatures. Beam deflection (i.e., creep) of greater than or equal to about 4 mm may not be acceptable by original equipment manufacturers (OEMs).

The present application combines a plastic honeycomb structure with a metal support disposed around greater than or equal to 3 sides thereof to produce the energy absorber device, e.g., a crash can (also known as a crash box). The honeycombs form channels that can be oriented, for example, parallel or perpendicular to one or more of the metal support walls.

The metal component can comprise greater than or equal to three walls (e.g., an open or closed structure). Open structure has three walls that form a channel with at least three open sides (e.g., two opposing walls and a connecting wall), while a closed structure has greater than or equal to four walls (comprising two sets of opposing walls that connect to form less than or equal to two open walls). Generally, closed structures provide an increased stiffness to weight ratio and better creep performance (i.e., less deflection or deformation) compared to an open structure. An open structure can facilitate ease of tooling, however.

The metal component can optionally comprise crush initiators. The crush initiators (e.g., stress points) can serve as weak points in the metal component which will crush more readily than other areas of the metal component, thereby enabling the manner of crushing as well as the angle of greatest energy absorption to be controlled (e.g., chosen and manufactured into the energy absorbing device). The crush initiator(s) can be located anywhere on the metal component. In some embodiments, crush initiator(s) are located at the junction of adjoining walls (e.g., at the corner(s) of the metal component). The crush initiators can be opening(s) (e.g., hole(s), slit(s), or other opening) and/or indentation(s). The size and shape of the crush initiators is dependent upon the desired crush characteristics. The crush initiator(s) enable facile tuning of the energy absorbing device. The crush initiators can also provide provisions for interlocking between the metal component and the plastic component during processing (e.g., during a co-molding process of the metal component and the plastic component). The number of crush-initiators located on the metal component is not limited and varies depending upon the length of the energy absorbing device. Desirably, a longer energy absorbing device will have a larger number of crush initiators, while a shorter energy absorbing device will have a smaller number of crush initiators. A hole located in a metal component (e.g., a mounting hole) can also serve as crush initiator. However, use of a hole such as a mounting hole as a crush initiator can result in a significant reduction in the stiffness of the crash can. Crush initiators such as an engineered depressions or beads in the metal component can assist in initiating crushing with a minimal reduction in component stiffness.

In addition to enabling predetermined crushing, e.g., tuning, of the energy absorbing device, if the crush initiator(s) comprise an opening, it can also serve as an anchor for the plastic component in the metal component. When the plastic component is attached into the metal component, the components can be attached together via the opening(s), e.g., with plastic, bonding agents, and the like. Desirably, the plastic component is co-molded into the metal component such that some plastic passes into the opening and solidifies, bonding the components together. Alternatively, or in addition to the crush initiator opening(s), the metal component can comprise attachment aperture(s) that can be located in a cavity of the metal component (e.g., wherein the cavity is a protrusion into the metal component channel, toward the plastic component). The attachment aperture(s) can align with thermoplastic piece(s) on a surface of the plastic component, e.g., such that, during assembly, the thermoplastic of the plastic portion can move through the aperture, into the cavity and solidify, thereby binding the metal component to the plastic component through the aperture(s).

Exemplary characteristics of the energy absorbing device include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. The metal component can comprise any metal(s) or metal alloy(es) having the desired characteristics, e.g., structural integrity, stiffness, and so forth. Some possibly metal component material(s) include aluminum, steel, titanium, chrome, magnesium, zinc, as well as combinations comprising at least one of the foregoing materials.

The plastic component can comprise any thermoplastic material or combination of thermoplastic materials that can be formed into the desired shape and provide the desired properties. For example, the thermoplastic material should possess one or more of the following properties: be capable of providing consistent energy absorption of greater or equal to about 10,000 Joules (J) during crushing, possess a modulus of greater than or equal to 1.5 gigaPascals (GPa), possess a failure strain of greater than or equal to about 60%, possess good chemical resistance, and/or retain mechanical properties even at elevated temperatures, i.e., less than or equal to 90° C. Exemplary plastic materials include thermoplastic materials as well as combinations of thermoplastic materials with metal, elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the plastic component can comprise Xenoy®, which is commercially available from SABIC Innovative Plastics IP B.V. The plastic component can also be made from combinations comprising at least one of any of the above-described materials.

The overall size, e.g., the specific dimensions of the energy absorbing device will depend upon its location in the vehicle and its function. For example, the length (l), height (h), and width (w) of the energy absorbing device, will depend upon the amount of space available in the desired location of use as well as the needed energy absorption. (See FIG. 2) The depth and wall thicknesses of the metal component and plastic component of the energy absorbing device will also depend upon the available space, desired stiffness, and the materials (or combination of materials) employed. For example, the length, l, of the energy absorbing device can be less than or equal to 500 mm, specifically, 50 mm to 250 mm, and more specifically 100 mm to 200 mm. The width, w, of the energy absorbing device can be less than or equal to 200 mm, specifically, 20 mm to 150 mm, and more specifically 40 mm to 100 mm. The height, h, of the energy absorbing device can be less than or equal to 300 mm, specifically, 60 mm to 200 mm, and more specifically 80 mm to 150 mm. The length is greater than or equal to the height which is greater than or equal to the width.

The thickness of the walls of the metal component can all be the same or can be different to enhance stiffness in a desired direction. For example, one of the walls, e.g., the wall connecting two opposite walls, can have a greater/lesser thickness than the opposing walls. In some embodiments, the metal walls have a thickness of less than or equal to 5 mm, specifically, 0.4 mm to 3 mm, and more specifically 0.5 mm to 1.5 mm. The plastic component can have a length commensurate with the length of the metal component. The thickness of the walls of the plastic component can be 0.5 mm to 10 mm, specifically, 2 mm to 5 mm, and more specifically 2.5 mm to 4 mm.

As with the dimensions of the components, the density of combs is dependent upon the desired stiffness, crush characteristics, and materials employed. The density can be 1 to 20 combs per 100 mm$^2$, specifically, 1 to 10 combs per 100 mm$^2$, and more specifically 1 to 5 combs per 100 mm$^2$.

The energy absorbing devices disclosed herein are configured to absorb a significant amount of impact energy when subjected to axial loading while also having acceptable creep performance (i.e., less deformation upon impact). This makes these devices useful as supporting members to other vehicle components. The energy absorbing devices disclosed herein, which can be co-molded, provide an integrated energy absorbing device (e.g., a crush can) to prevent vehicle damage (e.g., damage to the body in white (BIW) or frame of the vehicle) upon impact. The energy absorbing devices disclosed herein utilize various designs of a co-molded metal component and plastic component to absorb energy upon impact, with reduced creep as compared to a wholly plastic component, and with a low cost, lightweight design. The energy absorbing device can reduce repair costs of the vehicle after impact. For example, the energy absorbing device can reduce damage by absorbing the energy upon impact such that the BIW is not damaged or hardly damaged.

The energy absorbing device can be used in various locations in a vehicle. Generally, the energy absorbing device can be located behind the bumper beam and steel structure to which the bumper beam is attached, but in front of the BIW to serve as protection to the BIW from damage upon the application of force caused by an impact. In other words, between the BIW and the structure to which the bumper beam attaches. Other components which the energy absorbing device can be used to protect include: headlamp(s), the hood, the radiator, and the vehicle rails all intended for use in front of or behind the front bumper of the vehicle; and the tailgate, deck-lid, and tail-lamps all intended for use in front of or behind the rear bumper of vehicle as well as other components, and combinations comprising at least one of these components.

The energy absorbing device can be produced by several co-molding processes including insert molding (e.g., overmolding) to form an energy absorbing device comprising an integrated structure. The metal component can be formed by extrusion into the desired shape (e.g., a rectangular box like shape) and then the plastic component can be insert molded into the metal component using, for example, an insert injection molding process. The various processes and specific details of the metal component, plastic component, and assembly of the metal component and plastic component will be described in more detail with respect to the figures.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 9:
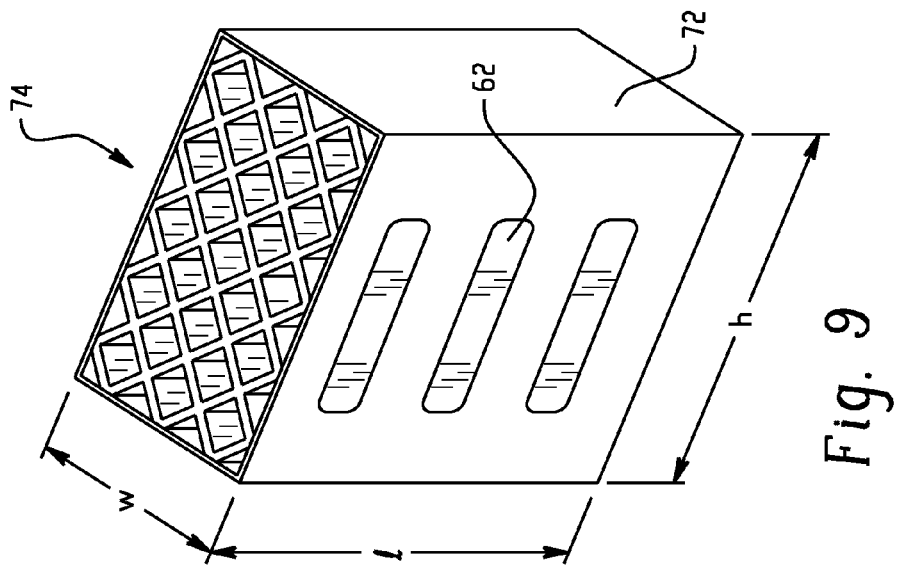
FIG. 9 is a front view of an energy absorbing device comprising a metal component and a plastic component.

FIGS. 2, 3, 5, 7, and 8 illustrate exemplary shapes for the plastic component of the energy absorbing device. Some exemplary designs for the plastic component include a layered structure comprising a plurality of layers of triangular structures connected therebetween by planar structures (e.g., FIG. 2), a hexagonal honeycomb structure (e.g., FIG. 3), an oval honeycomb structure (e.g., FIG. 5), a diamond shaped honeycomb structure (e.g., FIGS. 7 and 8), and so forth, as well as combinations comprising at least one of the foregoing. FIGS. 1, 4, and 9 illustrate exemplary shapes for the metal component of the energy absorbing device. Some exemplary designs for the metal component include an open structure comprising greater than or equal to three walls (e.g., FIG. 1) where the plastic component is molded into the cavity formed by the walls of the metal component or a closed structure comprising greater than or equal to four walls (e.g., FIGS. 4 and 9) where the plastic component is molded into the cavity formed by the walls of the metal component.

Figure 2:
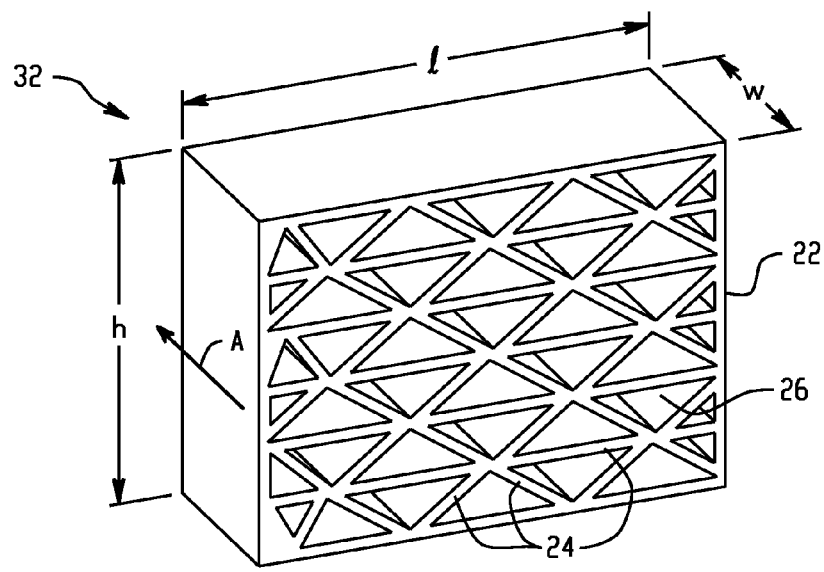
FIG. 2 is a front view of an energy absorbing device comprising a metal component and a plastic component.
Figure 3:
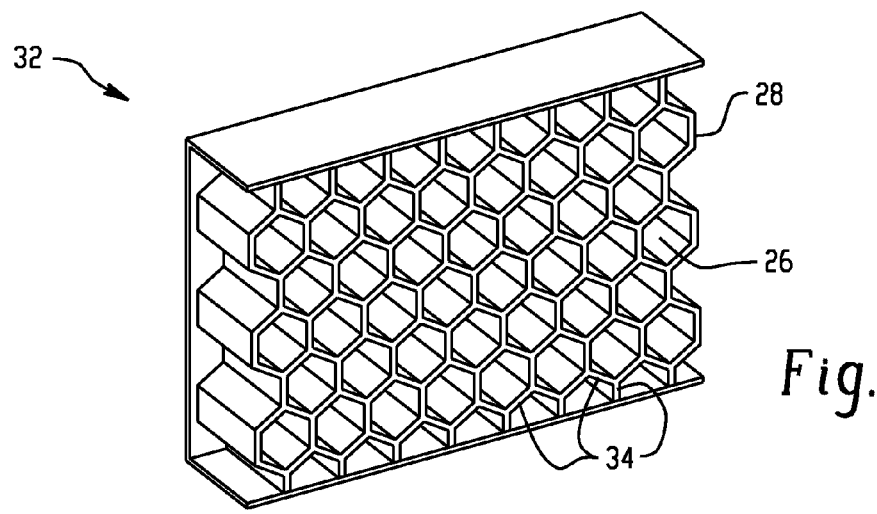
FIG. 3 is a front view of an energy absorbing device comprising a metal component and a plastic component.

Turning now to FIGS. 1 to 3, various embodiments of an energy absorbing device are illustrated. FIG. 1 illustrates a metal component 10. The metal component 10 can comprise greater than or equal to three walls 12, 14, 16 (e.g., a first wall, a second wall, and a third wall) forming a cavity 20, e.g., a channel with a base 14, and opposing walls 12, 16 extending from the base. FIG. 2 illustrates a view of a plastic component 22 that is co-molded with a metal component 10 where the plastic component 22 is located in the cavity 20 formed by the walls 12, 14, 16 of the metal component 10. The plastic component 22 can comprise a plurality of walls 24 forming channels throughout the plastic component 22. FIG. 3 also illustrates a plastic component 28 co-molded with a metal component 10. The plastic component can comprise any shape that will provide the desired properties. In FIG. 3, the plastic component 28 comprises walls 34 that form the shape of a hexagonal honeycomb. The walls 24, 34 of the plastic component 22, 28 can define a plurality of channels 26, 30.

The channels 26, 30 can extend through the plastic component 22, 28 in a direction parallel or perpendicular to any or all of the walls 12, 14, 16 or any combination comprising at least one of the foregoing walls 12, 14, 16 of the metal component 10. The channels 26 have an axis "A" (illustrated in FIGS. 2 and 7) that extends through the channels. In the various embodiments, some (FIGS. 2 and 3) or all (e.g., FIGS. 6 and 9) of the walls can be oriented parallel to the axis "A". In FIGS. 2 and 3, the base, wall 14 that connects opposing walls 12,16, is oriented perpendicular to the axis A. Orienting the base, wall 14, perpendicular to axis A allows for ease of tooling. For example, during injection molding of the energy absorbing device, the core of the injection molding tool will move in a direction normal to the base, wall 14, thereby facilitating ease of tooling.

The metal component 10 can optionally comprise an opening(s) 18 which allows the material of the plastic component to flow therethrough during the molding process to join the metal component 10 and the plastic component 22, 28 to form an integral energy absorbing device 32, (e.g., a device wherein the metal component and the plastic component are not separable without damage to one or both components). In other words, the plastic component is inseparable from the metal component (e.g., without damage to one or both components). The metal and plastic components are formed as a singular component. The opening(s) 18 can be located on any surface (e.g., any of walls 12, 14, 16) or a combination of surfaces (e.g., any combination of walls 12, 14, 16 comprising at least one of the foregoing) of the metal component 10. In one embodiment, the opening(s) 18 can be located at the juncture between any two of the walls of the metal component 10 as illustrated in FIG. 1.

The opening(s) 18 can optionally function as a crush initiator that serves to provide localized crushing (e.g., crushing of the energy absorbing device 30 at the crush initiator point) so that other portions of the vehicle structure will not fail upon the application of force during an impact. The crush initiator enables the energy absorbing device 32 to absorb significant amounts of impact energy while subjected to axial loading (e.g., upon the application of a force during a collision). When used as a supporting member to other vehicle components and subjected to a transverse load, the energy absorbing device 32 has low deformation. The energy absorbing device assists vehicle bumpers in being able to attain the RCAR, Allianz, and Thatcham structural test protocols for bumpers. Additionally, the energy absorbing device is capable of assisting vehicle bumpers and body structure in meeting high speed front crash safety protocols such as FMVSS, IIHS, and EuroNCAP (e.g., greater than or equal to 20 miles per hour). Creep of the energy absorbing device and bumper beam is measured by subjecting the energy absorbing device and bumper beam to high temperature loading, i.e., less than or equal to 90° C. for a time period of 600 to 1,000 hours or greater. The downward deflection due to the gravitational load of the bumper beam of the energy absorbing device is measured. Material testing for creep of the plastic component can be according to ASTM D2990-09 and ISO 899, while that the for the metal component can be according to can follow ASTM E139-06.

The metal component 10 can also optionally comprise additional walls (e.g., a fourth wall, fifth wall, and/or sixth wall (not illustrated)) that enclose the cavity and create a closed box shaped structure as previously described.

Turning now to FIGS. 4 through 7, additional embodiments of an energy absorbing device 50 are illustrated. FIG. 4 illustrates a metal component 40 comprising walls (e.g., first wall 42, second wall 44, third wall 46, and fourth wall 48) forming a cavity 54 therein. The metal component 40 comprises a closed box shaped structure as previously described. The metal component 40 can comprise an aperture(s) 52 on at least one wall that, during the forming of the energy absorbing device 50, allows material from the plastic component 56, e.g., piece 60, to flow therethrough and create plastic element(s) 62 (which can be the same or a different material as the plastic component) on at least one wall of the metal component 40. The element(s) 62 lock the plastic component within the metal component, thereby preventing the removal thereof (without breaking the element off of the plastic component). Three thermoplastic pieces 62 are illustrated in FIG. 6.

Any of the walls (e.g., walls 42, 44, 46, and/or 48) of the metal component 40 or any combination of the walls of the metal component 40 can further optionally comprise a crush initiator(s) 64 to provide localized crushing at that point to prevent other portions of the vehicle structure (e.g., BIW) from failing upon the application of force during an impact. For example, the crush initiator(s) 64 can be located at the junction between walls 42 and 46, 46 and 44, 44 and 48, or 42 and 48. Any number of crush initiators 18 can be present, provided that the number of crush initiators 18 is sufficient to provide localized crushing at those points.

FIG. 5 illustrates a plastic component 56 which can be co-molded with the metal component 40 and located in the cavity 54 created by the walls of the metal component 40. The plastic component 56 can comprise a plurality of members 58 containing channels 26 therein. FIG. 5 illustrates a plurality of oval shaped members, while FIG. 7 illustrates a plurality of diamond shaped members.

The assembled energy absorbing device 50 is illustrated by FIG. 6. The plastic piece(s) 62 can be oriented such that a wall of the metal component 40 is perpendicular to the axis of the channels 26 of the plastic component 56 after forming In another embodiment, the thermoplastic piece(s) 62 can be oriented such that a wall of the metal component 40 is parallel to the axis of the channels 26 of the plastic component 56.

Figure 7:
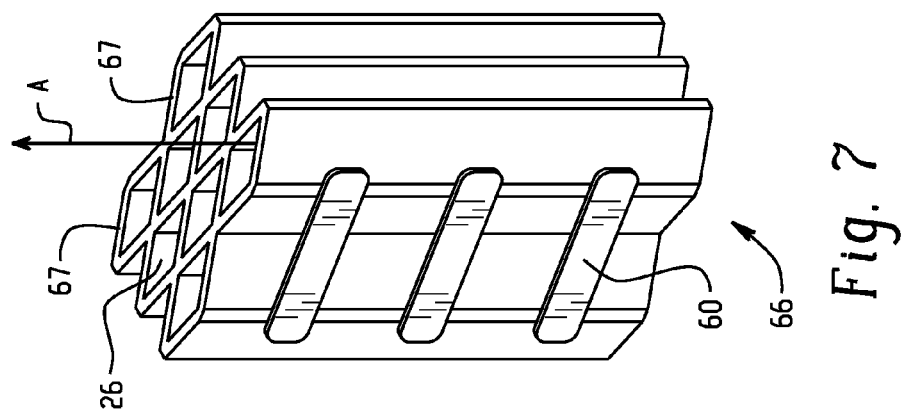
FIG. 7 is a front view of a plastic component of an energy absorbing device.

In an alternate embodiment, illustrated by FIG. 7, a diamond shaped plastic component 66 is illustrated. The plastic component 66 comprises members 67 defining channels 26 therein. The plastic component 66 can be co-molded with metal component 40 to provide a single unit assembled energy absorbing device (not illustrated).

Figure 8:
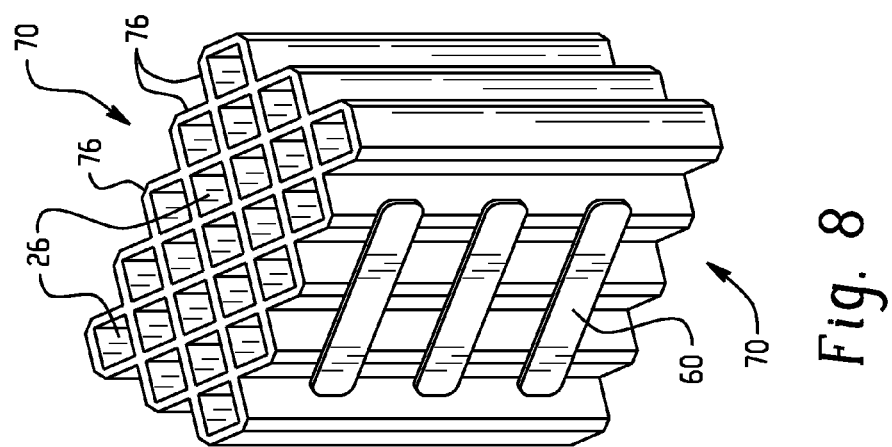
FIG. 8 is a front view of a plastic component of an energy absorbing device.

FIGS. 8 and 9 illustrate a further embodiment of a plastic component 70, metal component 72, and assembly of an energy absorbing device 74. The plastic component 70 can comprise a plurality of members 76 defining channels 26 therein. In FIG. 8 a plurality of diamond shaped members are illustrated, although any shape for the members 76 can be utilized. For example, the members 76 can comprise any shape including, but not limited to, oval, circular, diamond, triangular, square, rectangular, hexagonal, honeycomb, pentagonal, elliptical, etc., as well as combinations comprising at least one of the foregoing.

An energy absorbing device 74 is illustrated by FIG. 9. The channels 26 of the plastic component 70 comprise an axis illustrated by the line C-C in FIG. 8. The metal component 72 comprises greater than or equal to four walls such that a wall of the metal component 72 is parallel to the axis of the channels 26. The metal component 72 can comprise an aperture(s) 52 (not illustrated) on at least one wall that, during the forming of the energy absorbing device 74, allows material from the plastic component 70, e.g., piece 60 illustrated in FIGS. 7 and 8, to flow therethrough and create plastic element(s) 62 (which can be the same or a different material as the plastic component) on at least one wall of the metal component 72. The element(s) 62 lock the plastic component within the metal component, thereby preventing the removal thereof (without breaking the element off of the plastic component). Three thermoplastic pieces 62 are illustrated in FIG. 9.

The energy absorbing device 74 can be formed by co-molding the plastic component 70 and metal component 72 as previously described. Any of the walls of the metal component 72 or any combination of the walls of the metal component 72 can further optionally comprise a crush initiator(s) 64 (not illustrated) to provide localized crushing at that point to prevent other portions of the vehicle structure (e.g., BIW) from failing upon the application of force during an impact.

Figure 12:
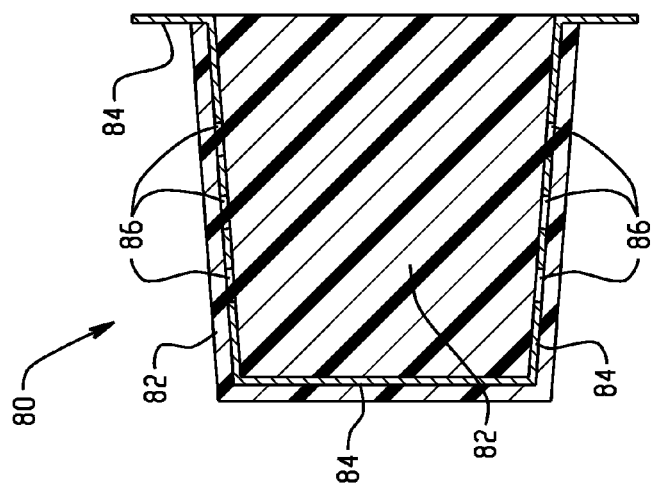
FIG. 12 is a side profile taken along line D-D in FIG. 11 of an energy absorbing device comprising a metal component and a plastic component.
Figure 11:
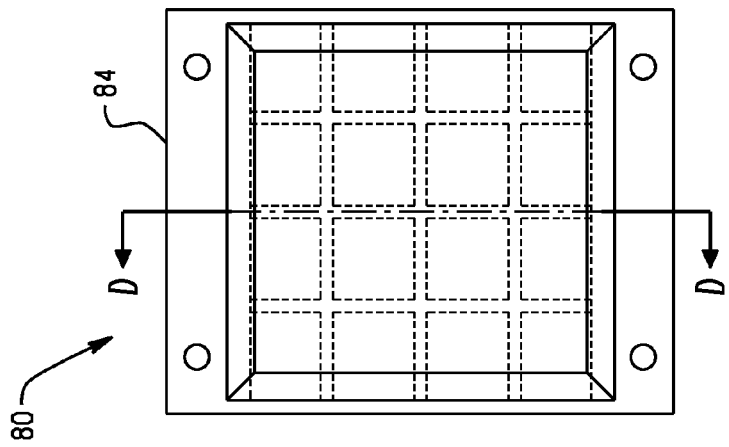
FIG. 11 is a front view of an energy absorbing device comprising a metal component and a plastic component.
Figure 10:
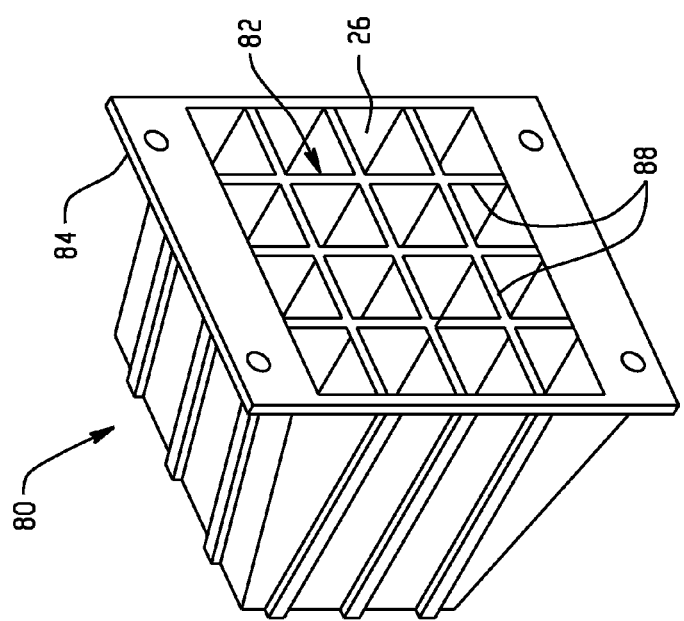
FIG. 10 is perspective view of an energy absorbing device comprising a metal component and a plastic component.

A method of forming an energy absorbing device 80 comprising a plastic component 82 and a metal component 84 is illustrated by FIGS. 10, 11, and 12. FIG. 10 illustrates an assembled energy absorbing device 80 where plastic from the plastic component 82 is allowed to flow through an aperture(s) 86 of the metal component 84 during the molding process to form a single piece assembled energy absorbing device 80. FIG. 12 illustrates a view along line D-D of FIG. 11 where it can be seen how the plastic of the plastic component 82 flows through the aperture(s) 86 of the metal component 84. The plastic component 82 further comprises walls defining channels 26 therein.

In an embodiment, an energy absorbing device comprises: a metal component comprising greater than or equal to three walls forming a metal component channel; and a plastic component having a honeycomb structure with a plurality of walls defining comb channels therein. The plastic component is located in the metal component channel forming a crash can. The plastic component is inseparable from the metal component without damage to the metal component and/or the plastic component. The energy absorbing device can be configured for impact energy absorption in a vehicle.

In one embodiment, a method of making an energy absorbing device can comprise: co-molding the metal component and the plastic component to form a crash can. The metal component can comprise greater than or equal to three walls forming a metal component channel and the plastic component can have a honeycomb structure with a plurality of walls defining comb channels therein.

In one embodiment, a vehicle can comprise: a vehicle component; an energy absorbing device located adjacent to the vehicle component. The energy absorbing device can comprises: a metal component comprising greater than or equal to three walls forming a metal component channel; and a plastic component having a honeycomb structure with a plurality of walls defining comb channels therein. The plastic component can be located in the metal component channel and is inseparable therefrom without damage to the metal component and/or the plastic component.

In the various embodiments, (i) the metal component can comprise a fourth wall that encloses the channel; and/or (ii) a wall of the metal component can comprise an aperture, and wherein plastic material from the plastic component can be located in the aperture; and/or (iii) a wall of the metal component can further comprise a crush initiator; and/or (iv) the crush initiator can be located on a corner of the metal component, at the intersection of two walls; and/or (v) the comb channels can comprise a shape selected from the group consisting circular, oval, square, rectangular, triangular, diamond, pentagonal, hexagonal, heptagonal, and octagonal, and combinations comprising at least one of the foregoing; and/or (vi) all of the walls of the metal component can be parallel to an axis of the channels; and/or (vii) two opposing walls can be parallel to an axis of the channels, and a wall connecting the two opposing walls can be perpendicular to the axis; and/or (viii) the metal component can comprise at least two sets of opposing walls, and wherein each set of the opposing walls joins the other set of opposing walls together; and/or (ix) the energy absorbing device can further comprise a length that is greater than or equal to a height which is greater than or equal to a width, and wherein the length is less than or equal to 500 mm; and/or (x) the height can be less than or equal to 300 mm, and the width can be less than or equal to 200 mm; and/or (xi) the metal component can further comprise a cavity on a side of a wall opposite the plastic component, wherein the cavity has an aperture through the wall, and where a plastic element in the cavity connects to the plastic component through the aperture; and/or (xii) plastic from the plastic component can extend through an aperture in the metal component; and/or (xiii) the plastic component can be located in the metal component channel and be inseparable therefrom without damage to the metal component and/or the plastic component; and/or (xiv) the co-molding can comprise a process selected from the group consisting of injection molding, insert molding, and combinations comprising at least one of the foregoing; the method can further comprise flowing plastic through an aperture in the metal component; and/or (xv) the plastic can flow into a cavity on a side of the metal component wall opposite the plastic component, binding the metal component and plastic component together; and/or (xvi) the method can further comprise extruding plastic to form the plastic component; and/or (xvii) the vehicle component can be selected from the group consisting of the body in white (also known as the body in black), and wherein the energy absorbing device is located between the vehicle component and to which a bumper beam attaches.

The energy absorbing device disclosed herein offers efficient energy absorbing characteristics while being lightweight and less expensive than other all metal structures. The energy absorbing device disclosed herein also offers a single piece assembled energy absorbing device which can be formed by processes such as injection molding to make the energy absorbing device less expensive than all plastic extruded structures. Additionally, the integration of the metal component and the plastic component provides higher resistance to deformation than all plastic extruded or injection molded structures while providing efficient energy absorption characteristics as compared to all plastic injection molded structures.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An impact device, comprising:
   a metal component comprising greater than or equal to three walls forming a metal component channel; and
   a plastic component having a honeycomb structure with a plurality of walls defining comb channels therein;
   wherein the comb channels are oriented perpendicular to at least one of the three walls, and the plastic component is inseparable from the metal component without damage to at least one of the metal component and the plastic component;
   wherein a wall of the metal component comprises an aperture, and wherein plastic material from the plastic component is located in the aperture; and
   wherein the impact device can be located in a vehicle to prevent damage to the body in white upon impact.

2. The impact device of claim 1, wherein the comb channels comprise a shape selected from the group consisting circular, oval, square, rectangular, triangular, diamond, pentagonal, hexagonal, heptagonal, and octagonal, and combinations comprising at least one of the foregoing.

3. The impact device of claim 1, wherein two opposing walls are parallel to an axis of the channels, and a wall connecting the two opposing walls is perpendicular to the axis.

4. The impact device of claim 3, wherein the plastic component located in the metal component channel forms a crash can.

5. The impact device of claim 4, wherein the plastic component is inseparable from the metal component without damage to the metal component, the plastic component, or both the metal component and the plastic component.

6. The impact device of claim 1, wherein the plastic component is inseparable from the metal component without damage to the metal component, the plastic component, or both the metal component and the plastic component.

7. The impact device of claim 1, wherein the plastic component located in the metal component channel forms a crash can.

8. An impact device, comprising:
   a metal component comprising greater than or equal to three walls forming a metal component channel; and
   a plastic component having a honeycomb structure with a plurality of walls defining comb channels therein;
   wherein the comb channels are oriented perpendicular to at least one of the three walls, and the plastic component is inseparable from the metal component without damage to at least one of the metal component and the plastic component;
   wherein a wall of the metal component comprises an aperture, and wherein plastic material from the plastic component is located in the aperture;
   wherein the plastic component is inseparable from the metal component without damage to the metal component, the plastic component, or both the metal component and the plastic component;
   wherein two opposing walls are parallel to an axis of the channels, and a wall connecting the two opposing walls is perpendicular to the axis; and
   wherein the impact device can be located in a vehicle to prevent damage to the body in white upon impact.

9. A method of making an impact device, comprising:
   forming a metal component comprising greater than or equal to three walls forming a metal component channel;
   forming a plastic component, wherein the plastic component has a honeycomb structure with a plurality of walls defining comb channels therein wherein the comb channels that are oriented perpendicular to at least one of the three walls, and the plastic component is inseparable from the metal component without damage to at least one of the metal component and the plastic component; and
   flowing plastic through an aperture in the metal component to form an impact device configured for use in a motor vehicle.

10. The method of claim 9, wherein the plastic flows into a cavity on a side of the metal component wall opposite the plastic component, binding the metal component and plastic component together.

11. The method of claim 9, wherein two opposing walls are parallel to an axis of the channels, and a wall connecting the two opposing walls is perpendicular to the axis.

12. The method of claim 11, wherein the plastic component located in the metal component channel forms a crash can.

13. The method of claim 12, wherein the plastic component is inseparable from the metal component without damage to the metal component, the plastic component, or both the metal component and the plastic component.

14. The method of claim 9, wherein the plastic component is inseparable from the metal component without damage to the metal component, the plastic component, or both the metal component and the plastic component.

15. The method of claim 9, wherein the plastic component located in the metal component channel forms a crash can.

* * * * *